US011157752B2

(12) United States Patent
Iwai

(10) Patent No.: US 11,157,752 B2
(45) Date of Patent: Oct. 26, 2021

(54) DEGRADED FEATURE IDENTIFICATION APPARATUS, DEGRADED FEATURE IDENTIFICATION SYSTEM, DEGRADED FEATURE IDENTIFICATION METHOD, DEGRADED FEATURE IDENTIFICATION PROGRAM, AND COMPUTER-READABLE RECORDING MEDIUM RECORDING DEGRADED FEATURE IDENTIFICATION PROGRAM

(71) Applicant: PIONEER CORPORATION, Tokyo (JP)

(72) Inventor: Tomoaki Iwai, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 0 days.

(21) Appl. No.: 16/496,851

(22) PCT Filed: Feb. 23, 2018

(86) PCT No.: PCT/JP2018/006757
§ 371 (c)(1),
(2) Date: Sep. 23, 2019

(87) PCT Pub. No.: WO2018/180081
PCT Pub. Date: Oct. 4, 2018

(65) Prior Publication Data
US 2020/0080945 A1    Mar. 12, 2020

(30) Foreign Application Priority Data
Mar. 29, 2017    (JP) .............................. JP2017-065898

(51) Int. Cl.
*G06K 9/00*    (2006.01)
*G01N 21/956*    (2006.01)
(Continued)

(52) U.S. Cl.
CPC ... *G06K 9/00798* (2013.01); *G01N 21/95607* (2013.01); *G01N 21/95684* (2013.01);
(Continued)

(58) Field of Classification Search
CPC . G01S 7/4802; G01S 17/89; G01N 21/95684; G01N 2021/95615;
(Continued)

(56) References Cited

U.S. PATENT DOCUMENTS 4,796,998 A    1/1989  Soma et al.
9,483,952 B2 *  11/2016  Chew .................. G08G 5/0026
(Continued)

FOREIGN PATENT DOCUMENTS

EP    3130891 A1    2/2017
JP    62-80507 A    4/1987
(Continued)

OTHER PUBLICATIONS

International Search Report for related International Application No. PCT/JP2018/006757, dated May 15, 2018; English translation provided; 4 pages.

*Primary Examiner* — Michael Robert Cammarata
(74) *Attorney, Agent, or Firm* — Procopio, Cory, Hargreaves & Savitch LLP

(57) ABSTRACT

An object of the present invention is to provide a degraded feature identification apparatus and the like that can identify a degraded feature from a large number of features. The present invention receives light emitted from a moving object and reflected by a feature, acquires reflection intensity data measured at the moving object, and identifies a degraded feature based on acquired reflection intensity data.

12 Claims, 12 Drawing Sheets

(51) Int. Cl.
    *G06T 7/00*            (2017.01)
    *G01S 17/89*         (2020.01)
    *E01C 23/01*        (2006.01)
    *G01S 7/48*          (2006.01)

(52) U.S. Cl.
    CPC .............. *G01S 17/89* (2013.01); *G06T 7/001* (2013.01); *E01C 23/01* (2013.01); *G01N 2021/95615* (2013.01); *G01S 7/4802* (2013.01); *G06T 2207/30256* (2013.01)

(58) Field of Classification Search
    CPC ................ G06K 9/00798; G06T 7/001; G06T 2207/30256; E01C 23/01
    See application file for complete search history.

(56) References Cited

U.S. PATENT DOCUMENTS

| | | | | |
|---|---|---|---|---|
| 9,863,928 | B1* | 1/2018 | Peterson | G01N 33/42 |
| 10,691,958 | B1* | 6/2020 | Fink | G06K 9/6267 |
| 2003/0072471 | A1* | 4/2003 | Otsuka | G06K 9/4604 |
| | | | | 382/103 |
| 2011/0234450 | A1* | 9/2011 | Sakai | G01S 17/42 |
| | | | | 342/70 |
| 2013/0027511 | A1* | 1/2013 | Takemura | G06K 9/00805 |
| | | | | 348/42 |
| 2013/0169794 | A1* | 7/2013 | Shimomura | B60R 1/00 |
| | | | | 348/128 |
| 2014/0184800 | A1* | 7/2014 | Hirai | G02B 5/3025 |
| | | | | 348/148 |
| 2015/0371094 | A1* | 12/2015 | Gardiner | E01C 23/01 |
| | | | | 348/148 |
| 2016/0026879 | A1* | 1/2016 | Maeda | G06K 9/00798 |
| | | | | 382/104 |
| 2016/0356623 | A1* | 12/2016 | Matsumoto | G08G 1/096811 |
| 2017/0177951 | A1* | 6/2017 | Yang | G06T 7/155 |
| 2017/0229012 | A1* | 8/2017 | Bills | G08G 1/0133 |
| 2017/0261974 | A1* | 9/2017 | Ebe | B60W 50/14 |
| 2018/0023966 | A1 | 1/2018 | Iwai et al. | |
| 2018/0038701 | A1 | 2/2018 | Iwai et al. | |
| 2018/0067494 | A1* | 3/2018 | Schiffmann | B60W 30/12 |
| 2018/0099667 | A1* | 4/2018 | Abe | B60W 30/025 |
| 2018/0148060 | A1* | 5/2018 | Hashimoto | B62D 15/0255 |
| 2018/0151066 | A1* | 5/2018 | Oba | G01C 21/3407 |
| 2018/0247139 | A1 | 8/2018 | Kaneko et al. | |
| 2019/0217864 | A1* | 7/2019 | Kusukame | G05D 1/0088 |
| 2020/0019792 | A1* | 1/2020 | Sano | G06T 7/73 |

FOREIGN PATENT DOCUMENTS

| | | |
|---|---|---|
| JP | 2009-58429 A | 3/2009 |
| JP | 2010-44472 A | 2/2010 |
| JP | 2013-139672 A | 7/2013 |
| JP | 2014-228300 A | 12/2014 |
| JP | 2016-170708 A | 9/2016 |
| JP | 2017-9378 A | 1/2017 |
| WO | 2016/139748 A1 | 9/2016 |
| WO | 2017/038134 A1 | 3/2017 |

\* cited by examiner

μ : average value of reflection intensity
σ : standard deviation

μ : average value of reflection intensity
σ : standard deviation

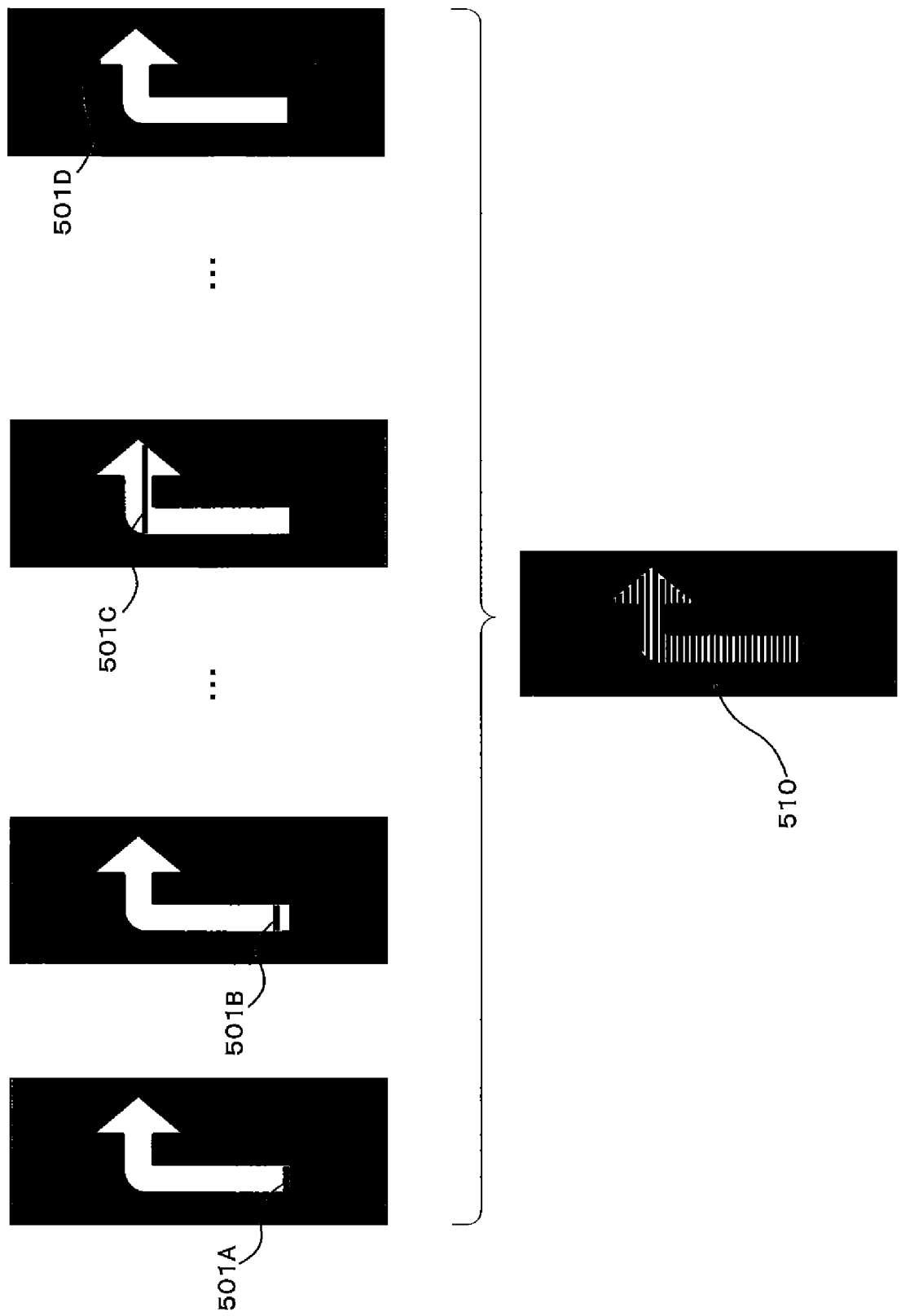

DEGRADED FEATURE IDENTIFICATION APPARATUS, DEGRADED FEATURE IDENTIFICATION SYSTEM, DEGRADED FEATURE IDENTIFICATION METHOD, DEGRADED FEATURE IDENTIFICATION PROGRAM, AND COMPUTER-READABLE RECORDING MEDIUM RECORDING DEGRADED FEATURE IDENTIFICATION PROGRAM

CROSS-REFERENCE TO RELATED APPLICATIONS

This application is a U.S. National Stage entry of PCT Application No: PCT/JP2018/006757 filed Feb. 23, 2018, which claims priority to Japanese Patent Application No. 2017-065898, filed Mar. 29, 2017, the contents of which are incorporated herein by reference.

TECHNICAL FIELD

The present application relates to a technical field of a degraded feature identification apparatus that identifies a degraded feature.

BACKGROUND ART

In an automatic driving vehicle, it is necessary to estimate an own vehicle position with high accuracy by matching a feature position measured by a sensor, such as light detection and ranging, laser imaging detection and ranging (LIDAR) with a feature position described in map data for automatic driving. There are a sign, a signboard, a white line drawn on a road, and the like as features to be used, and map data for automatic driving including positions of these features needs to be maintained and updated according to the reality in order for stable automatic driving to be performed. For example, in a case where a white line has partially disappeared due to aging deterioration or the like, it is necessary to reflect degradation information on data representing the white line in map data.

For this reason, conventionally, it has been necessary to conduct an on-site survey to see if there is any degraded feature by running a map maintenance vehicle. Under such circumstances, with the development of a laser measurement technique, development of a technique for utilizing point cloud data, which is obtained by measuring a ground surface, for using and updating map data has been advanced. For example, Patent Literature 1 discloses a technique for extracting data obtained by measuring a road surface from point cloud data that include a large pieces of data of features other than a road surface, such as a building, a road tree, and the like. The above technique can be used as preprocessing for extracting a white line drawn on a road.

CITATION LIST

Patent Literature

Patent Literature 1: JP 2017-9378 A

SUMMARY OF INVENTION

Technical Problem

Although a road area can be determined from the point cloud data obtained by measuring a ground surface by using the technique of Patent Literature 1, it has been not possible to determine a degradation state of a feature. However, in an automatic driving technique, the importance of processing using information of a feature in own vehicle position estimation, lane keeping, recognition of a travelable area, and the like is extremely high, and an influence of a degradation state of a feature on the processing is also large. For this reason, it is important to grasp a degradation state of an actual feature and reflect a degraded feature on the map data.

In view of the above circumstances, an example of an object of the present invention is to provide a degraded feature identification apparatus and the like that can identify a degraded feature from a large number of features.

Solution to Problem

An embodiment of an invention described herein is a degraded feature identification apparatus comprising: an acquisition unit that acquires reflection intensity data based on light emitted from an emission unit and reflected by a feature; and an identification unit that identifies a degraded feature based on the reflection intensity data acquired by the acquisition unit.

An embodiment of an invention described herein is a degraded feature identification apparatus comprising: an acquisition unit that acquires reflection intensity data based on light emitted from an emission unit provided on one or a plurality of moving bodies and reflected by a feature; an identification unit that identifies a degraded feature based on the reflection intensity data acquired by the acquisition unit; and an update unit that updates map data corresponding to the degraded feature identified by the identification unit.

An embodiment of an invention described in herein is a degraded feature identification apparatus comprising: an acquisition unit that acquires degraded feature information on a degraded feature identified by a moving object device provided on one or a plurality of the moving bodies based on light emitted from an emission unit provided on the moving bodies and reflected by a feature; and an update unit that updates map data corresponding to the feature indicated by the degraded feature information acquired by the acquisition unit.

An embodiment of an invention described herein is a degraded feature identification system including a moving object device provided on a moving object and a degraded feature identification apparatus, wherein the moving object device comprises: a transmission unit that transmits reflection intensity data based on light emitted from an emission unit provided on the moving bodies and reflected by a feature to the degraded feature identification apparatus, and the degraded feature identification apparatus comprises: an acquisition unit that acquires the reflection intensity data from the moving object device; and an identification unit that identifies a degraded feature based on the reflection intensity data acquired by the acquisition unit.

An embodiment of an invention described herein is a degraded feature identification method by a degraded feature identification apparatus, comprising: an acquisition step of acquiring reflection intensity data based on light emitted from an emission unit and reflected by a feature; and an identification step of identifying a degraded feature based on the reflection intensity data acquired by the acquisition step.

An embodiment of an invention described herein is a degraded feature identification program that causes a computer to function as an acquisition unit that acquires reflection intensity data based on light emitted from an emission unit and reflected by a feature, and an identification unit that identifies a degraded feature based on the reflection intensity data acquired by the acquisition unit.

An embodiment of an invention described in herein is a computer-readable recording medium recording a degraded feature identification program that causes a computer to function as an acquisition unit that acquires reflection intensity data based on light emitted from an emission unit and reflected by a feature, and an identification unit that identifies a degraded feature based on the reflection intensity data acquired by the acquisition unit.

BRIEF DESCRIPTION OF THE DRAWINGS

FIG. 11 is a conceptual diagram in a case where reflection intensity map data 510 is generated by combining a plurality of pieces of the painted portion reflection intensity data 501.

MODES FOR CARRYING OUT THE INVENTION

Embodiment of the present invention will be described with reference to the FIG. 1. In addition, FIG. 1 is a block diagram illustrating a configuration of a degraded feature identification apparatus according to a present embodiment.

Figure 1:
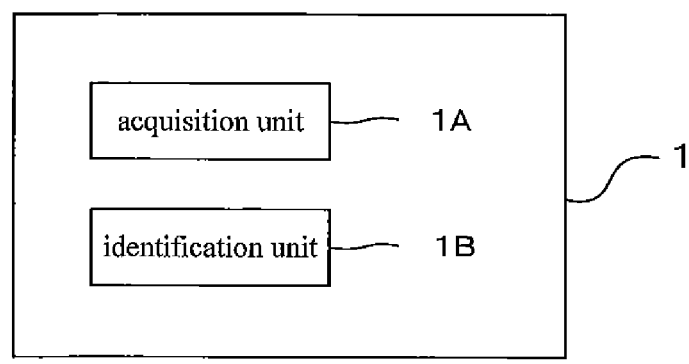
FIG. 1 is a block diagram illustrating a configuration of a degraded feature identification apparatus according to an embodiment.

As shown in FIG. 1, the degraded feature identification apparatus 1 according to the present embodiment is configured to include an acquisition unit 1A and an identification unit 1B.

An acquisition unit 1A acquires reflection intensity data based on light emitted from an emission unit and reflected by a feature.

An identification unit 1B identifies a degraded feature based on the reflection intensity data acquired by the acquisition unit 1A.

As described above, according to a degraded feature identification apparatus 1 according to the present embodiment, the acquisition unit 1A acquires the reflection intensity data based on the light emitted from an emission unit and reflected by a feature, and the identification unit 1B identifies a degraded feature based on the reflection intensity data acquired by the acquisition unit 1A. Therefore, the degraded feature can be identified based on the reflection intensity data based on the light emitted from an emission unit and reflected by a feature. Further, by reflecting degradation information on map data regarding a feature determined to be degraded, it becomes possible to quickly and efficiently maintain an actual feature, and stable automatic driving becomes possible.

Embodiment

An embodiment will be described with reference to FIGS. 2 to 7. Note that the embodiment described below is an embodiment in a case where the present invention is applied to a map data management system S.

[1. Configuration and Outline of Map Data Management System S]

Figure 2:
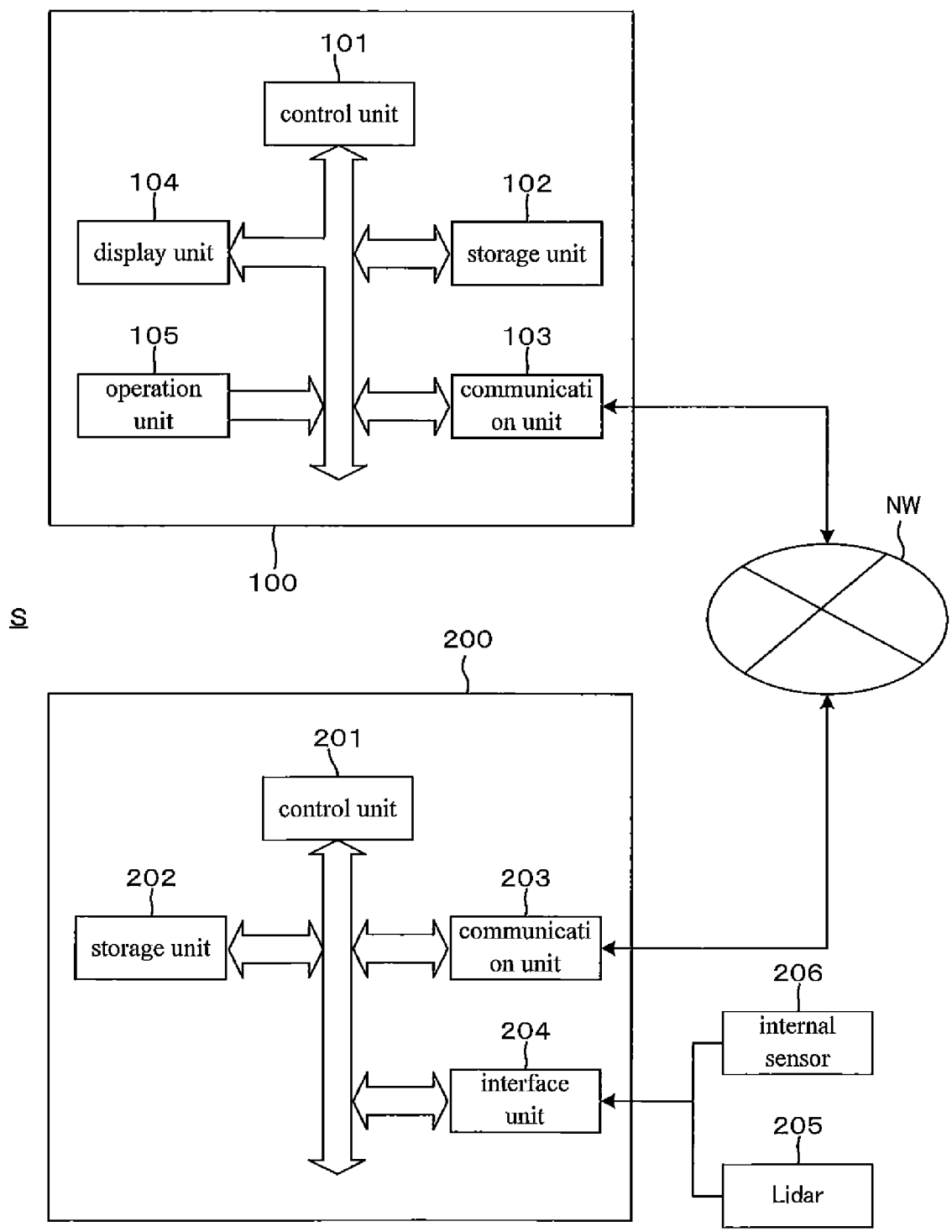
FIG. 2 is a block diagram illustrating a configuration of a Map Data Management System according to an embodiment.

As shown in FIG. 2, the map data management system S of the present embodiment includes a server apparatus 100 that manages map data, and an on-vehicle terminal 200 mounted on each of a plurality of vehicles, and the server apparatus 100 and each of the on-vehicle terminals 200 are connected via a network NW. Note that, although one of the on-vehicle terminal 200 is shown in FIG. 2, the map data management system S may include a plurality of the on-vehicle terminals 200. Further, the server apparatus 100 may also be configured with a plurality of devices.

Figure 3A:
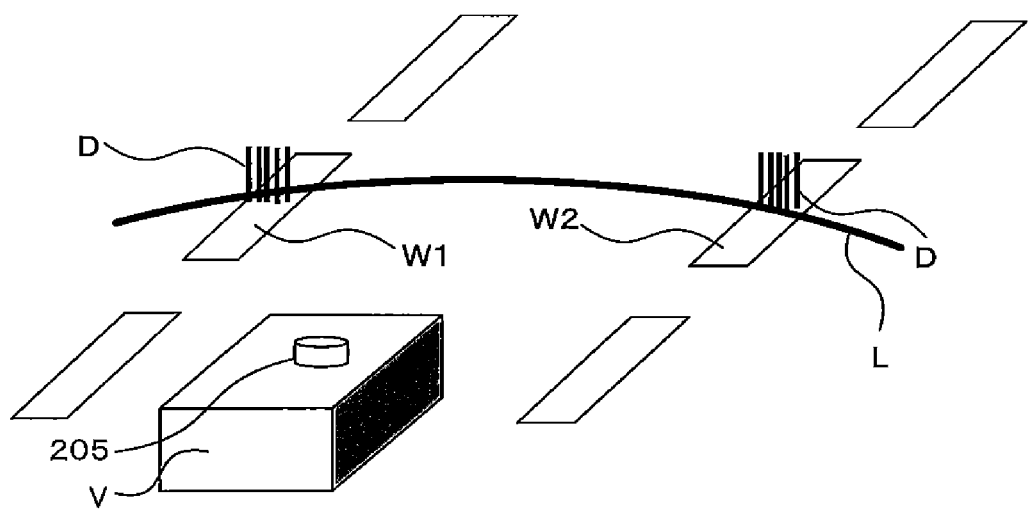
FIG. 3(A) is a view illustrating how Lidar measures the light reflection intensity at a white line that is not degraded according to an embodiment.
Figure 4A:
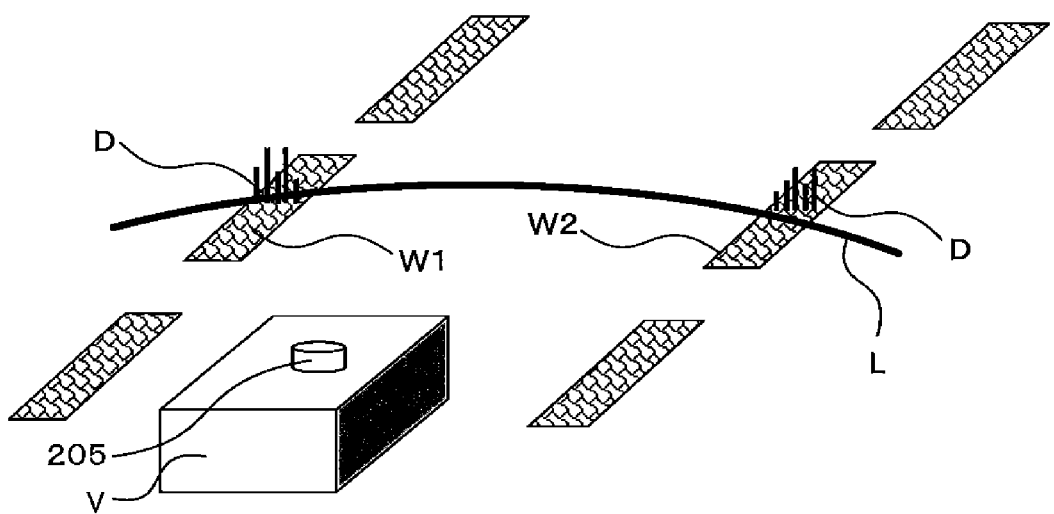
FIG. 4(A) is a view illustrating how Lidar measures the light reflection intensity at a white line that is degraded according to an embodiment.

As shown in FIGS. 3(A) and 4(A), the on-vehicle terminal 200 transmits, to the server apparatus 100, reflection intensity data D indicating reflection intensity measured by receiving reflected light from a white line W1 and a white line W2 (an example of "feature") of light L emitted by Lidar 205 itself in a vehicle V on which the Lidar 205 is mounted together with the on-vehicle terminal 200. Note that a bar shown as the reflection intensity data D in FIGS. 3(A) and 4(A) represents the magnitude of the reflection intensity at a point by its length (the longer the bar is, the higher the reflection intensity is). The reflection intensity data D is data including the reflection intensity at each point irradiated with the light L emitted by the Lidar 205. FIGS. 3(A) and 4(A) show that the reflection intensities at five points are measured for each of the white line W1 and the white line W2.

Figure 3B:
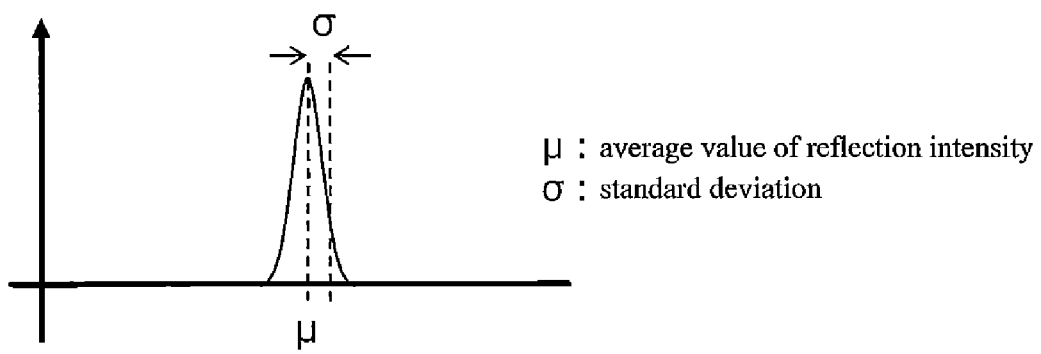
FIG. 3(B) is a view illustrating an example of a graph which carried out the statistical processing of the said reflective intensity.
Figure 4B:
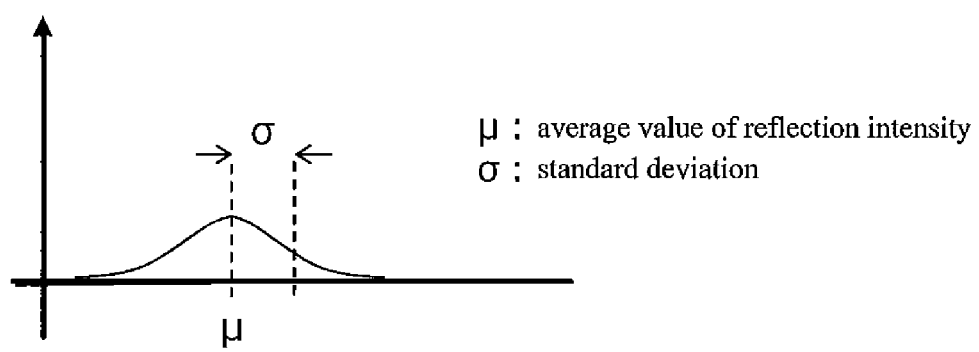
FIG. 4(B) is a view illustrating an example of a graph which carried out the statistical processing of the said reflective intensity.

The server apparatus 100 identifies a degraded feature based on a plurality of pieces of the reflection intensity data D received from each of a plurality of the on-vehicle terminals 200. Specifically, the degraded feature is identified by statistically processing a plurality of the reflection intensity data D. For example, as shown in FIG. 3(A), as for a white line that is not degraded, the reflection intensity at each point in the white line has a high value and a uniform value. For this reason, as shown in FIG. 3(B), an average value μ calculated based on a plurality of reflection intensities becomes smaller, or the standard deviation σ becomes larger. On the other hand, as shown in FIG. 4(A), as for a white line that is degraded, the reflection intensity at each point in the white line has a low value or an uneven value. For this reason, as shown in FIG. 4(B), the average value μ calculated based on a plurality of reflection intensities becomes smaller, or the standard deviation σ becomes larger. In view of the above, the server apparatus 100 compares the average value μ and the standard deviation σ calculated based on a plurality of reflection intensities with a threshold, so as to determine whether or not a feature is degraded, and identify a degraded feature. Then, the server apparatus 100 updates map data corresponding to the degraded feature. Note that the map data may be updated by a device that has received an instruction from the server apparatus 100.

[Configuration of On-Vehicle Terminal 200]

Next, a configuration of the on-vehicle terminal 200 according to the present embodiment will be described. As shown in FIG. 2, the on-vehicle terminal 200 is roughly configured with a control unit 201, a storage unit 202, a communication unit 203, and an interface unit 204.

The storage unit 202 is configured with, for example, a hard disk drive (HDD), a solid state drive (SSD), or the like, and stores an operating system (OS), a reflection intensity data processing program, map data, the reflection intensity data D, various pieces of data, and the like. Map position information indicating a position of a feature (a white line in the present embodiment) to be subjected to degradation determination, and a feature ID for distinguishing the feature from other features are described in the map data (since the map position information and the feature ID are information linked to one feature, the feature ID can be deemed as one piece of position information indicating a position of the one feature). In the example of FIG. 3(A), different feature IDs are assigned to the white line W1 and the white line W2. Note that, in a case where a white line is long and extends to several hundred meters or the like, and it is inappropriate to handle the white line as one feature, the white line is divided into portions of a certain length (for example, 5 m) and each of the portions is handled as a separate feature and provided with a feature ID. Further, map data (map data in which map position information and a feature ID are described for each feature) similar to the map data stored in the storage unit 202 is also stored in a storage unit 102 of the server apparatus 100. The on-vehicle device 200 and the server apparatus 100 can identify the same feature by a feature ID. Furthermore, as the map data stored in the storage unit 202, for example, map data of the whole country may be stored, or map data corresponding to a certain area including a current position of a vehicle may be received in advance from the server apparatus 100 or the like and stored.

The communication unit 203 controls a communication state between the on-vehicle terminal 200 and the server apparatus 100.

The interface unit 204 implements an interface function when data is exchanged between the Lidar 205 and an internal sensor 206, both of which are an external device, and the on-vehicle terminal 200.

The Lidar 205 is equipment that is attached to a roof of the vehicle, or the like, and, as one function, constantly emits infrared laser light in a circle around a vehicle (emits infrared laser light downward at a certain angle from the roof) and receives light reflected by a point on a surface of a feature around the vehicle to generate the reflection intensity data D that indicates the reflection intensity at each point. The reflection intensity data D, which is data indicating the intensity of laser light emitted horizontally and reflected by a ground surface or a feature, includes a portion with low reflection intensity (a ground surface portion where no feature exists) and a portion with high reflection intensity (a portion where a feature exists). Further, a plurality of pieces of the Lidar 205 may be attached to the front of a vehicle, rear of a vehicle, or the like, and the reflection intensity data of a visual field range acquired by each piece of the Lidar 205 may be combined so that the reflection intensity data D around the vehicle may be generated.

When the reflection intensity is measured, the Lidar 205 immediately transmits the reflection intensity data D (including a portion with low reflection intensity and a portion with high reflection intensity) to the on-vehicle terminal 200 via the interface unit 204. When receiving the reflection intensity data D from the Lidar 205, the control unit 201 stores the received reflection intensity data D in the storage unit 202 in association with measurement position information indicating a position of a vehicle (the Lidar 205) at the time the reflection intensity data D is received and measurement date and time information indicating the date and time at which the reflection intensity data D is received. Note that the control unit 201 may delete, from the storage unit 202, a piece of the reflection intensity data D stored in the storage unit 202, the measurement position information, and the measurement date and time information, for which a predetermined time has elapsed since measurement, or which is transmitted to the server apparatus 100.

The internal sensor 206 is a generic term for a satellite positioning sensor (Global Navigation Satellite System (GNSS)), a gyro sensor, a vehicle speed sensor, and the like mounted on a vehicle.

The control unit 201 is configured with a central processing unit (CPU) that controls the entire control unit 201, a read only memory (ROM) that stores a control program for controlling the control unit 201 and the like in advance, and a random access memory (RAM) that temporarily stores various pieces of data. Then, the CPU reads and executes various programs stored in the ROM and the storage unit 202 to implement various functions.

The control unit 201 acquires estimated own vehicle position information. The estimated own vehicle position information may be generated by a device outside the on-vehicle terminal 200, or may be generated by the control unit 201. For example, the estimated vehicle position information can be generated by matching a feature position measured by the Lidar 205 with a feature position of map data for automatic driving, generated based on information detected by the internal sensor 206 and map data, or generated by a combination of these.

Further, the control unit 201 predicts an actual white line position viewed from an own vehicle (the Lidar 205) based on the estimated own vehicle position information and the map position information of a white line indicated by the map data. At this time, the control unit 201 calculates and sets a white line prediction range including a white line with a certain margin.

Figure 5:
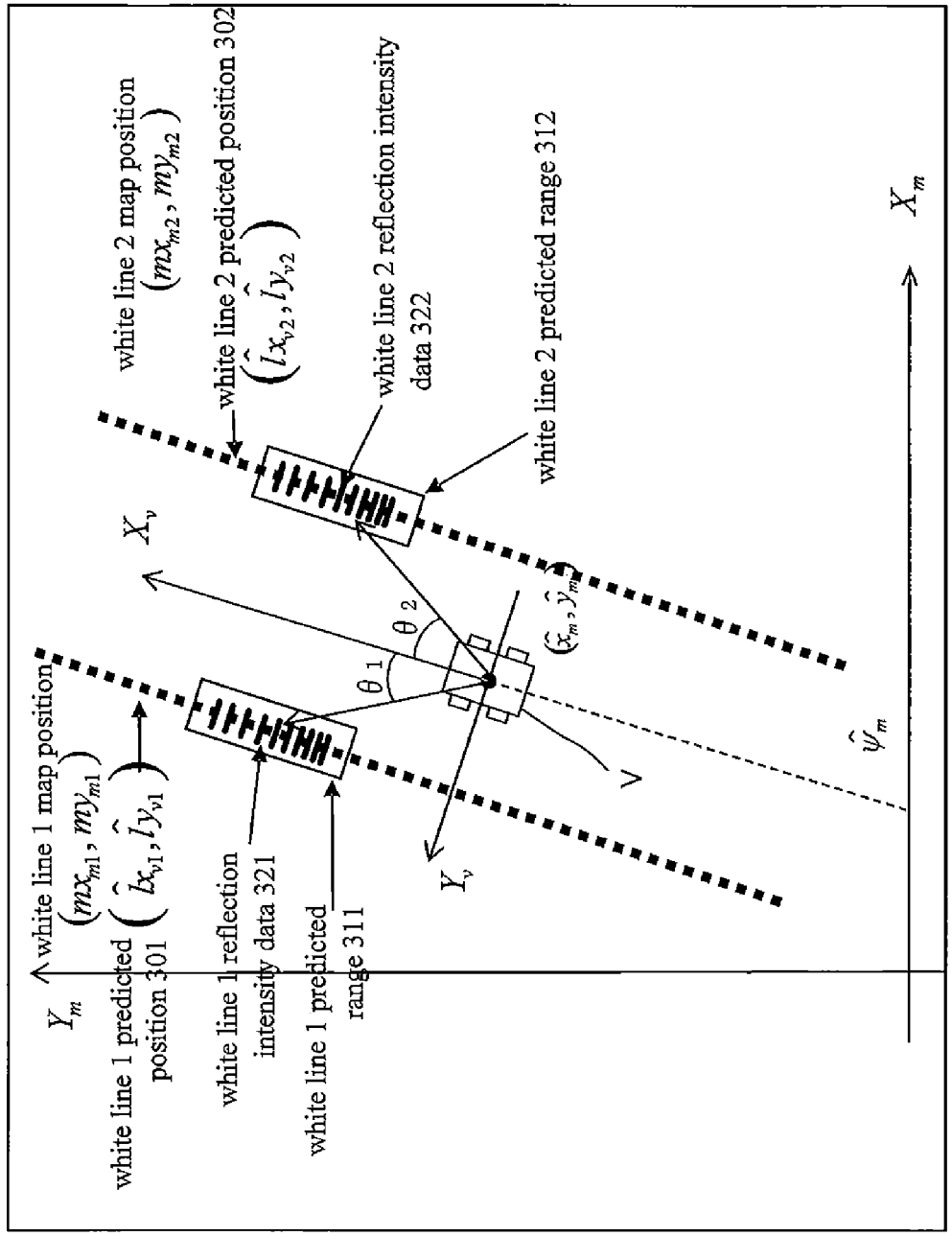
FIG. 5 is a view for describing how to calculate the white line prediction range according to an embodiment.

Here, a method of setting the white line prediction range will be specifically described with reference to FIG. 5. A coordinate system and the like in FIG. 5 are as described below.

Map coordinate system:

$X_m, Y_m$

Vehicle coordinate system:

$$X_v, Y_v$$

White line map position in map coordinate system:

$$(mx_m, my_m)$$

White line predicted position in vehicle coordinate system:

$$(\hat{l}x_v, \hat{l}y_v)$$

Estimated own vehicle position in map coordinate system:

$$(\hat{x}_m, \hat{y}_m)$$

Estimated own vehicle azimuth in map coordinate system:

$$\hat{\psi}_m$$

The control unit 201 calculates a white line prediction range from a white line map position indicated by map position information of a white line in a traveling direction (for example, 10 m ahead) of the vehicle based on the estimated own vehicle position indicated by the estimated own vehicle position information. At this time, as shown in FIG. 5, in a case where a lane in which the vehicle V travels is divided by a white line 1 on the left side and a white line 2 on the right side, the white line prediction range is calculated for each of the white lines 1 and 2.

The methods of calculating the white line prediction range for the white line 1 and the white line 2 are similar, so here, a case of calculating the white line prediction range for the white line 1 will be described. First, the control unit 201 calculates the white line 1 predicted position 301 (white line predicted position for the white line 1) based on a white line 1 map position and the estimated own vehicle position. The white line predicted position is obtained by following Equation (1):

[Math 1]

$$\begin{bmatrix} \hat{l}x_v \\ \hat{l}y_v \end{bmatrix} = \begin{bmatrix} \cos\hat{\psi}_m & \sin\hat{\psi}_m \\ -\sin\hat{\psi}_m & \cos\hat{\psi}_m \end{bmatrix} \begin{bmatrix} mx_m - \hat{x}_m \\ my_m - \hat{y}_m \end{bmatrix} \quad (1)$$

Next, the control unit 201 sets a white line 1 predicted range 311 based on the white line 1 predicted position 301. Specifically, a certain range including the white line 1 predicted position 301 is set as the white line 1 predicted range 311. Then, the control unit 201 extracts white line 1 reflection intensity data 321 indicating the reflection intensity in the white line 1 predicted range 311 from the reflection intensity data D including the reflection intensities at a plurality of points.

The control unit 201 transmits the reflection intensity data 321 and 322 extracted as described above to the server apparatus 100 in association with feature IDs corresponding to the white line 1 map position and the white line 2 map position, and measurement date and time information corresponding to the reflection intensity data D from which the reflection intensity data 321 and 322 are extracted. Note that, hereinafter, the reflection intensity data D (which may be raw data measured by the Lidar 205 or data obtained by processing the raw data) measured by the Lidar 205 and stored in the storage unit 202 by the on-vehicle terminal 200 will be referred to as pre-extraction reflection intensity data D, and there will be a case where, among such pieces of data, the reflection intensity data D which indicates the reflection intensity extracted in the white line prediction range is referred to as post-extraction reflection intensity data D.

[3. Configuration of Server Apparatus 100]

Next, a configuration of the server apparatus 100 will be described. As shown in FIG. 2, the server apparatus 100 is roughly configured with a control unit 101, the storage unit 102, a communication unit 103, a display unit 104, and an operation unit 105.

The storage unit 102 is configured with, for example, an HDD, an SSD, or the like, and stores an OS, a white line degradation determination program, the reflection intensity data D received from the on-vehicle terminal 200, and other various pieces of data.

The communication unit 103 controls a communication state with the on-vehicle terminal 200.

The display unit 104 is configured of, for example, a liquid crystal display or the like, and displays information, such as a character and an image.

The operation unit 105 is configured with, for example, a keyboard, a mouse, and the like, receives an operation instruction from an operator, and outputs the content of the instruction to the control unit 101 as an instruction signal.

The control unit 101 includes a CPU that controls the entire control unit 101, a ROM that stores, in advance, a control program that controls the control unit 101 and the like, and a RAM that temporarily stores various pieces of data. Then, the CPU reads and executes various programs stored in the ROM and the storage unit 102 to implement various functions.

The control unit 101 determines a degradation state of a white line based on a plurality of pieces of the reflection intensity data D received from one or each of a plurality of the on-vehicle terminals 200. Then, the control unit 101 updates map data corresponding to a degraded feature so that the degraded feature can be identified as being degraded.

[4. Operation Example of Map Data Management System S]

[4.1 Operation Example at the Time of Reflection Intensity Data Processing]

Figure 6:
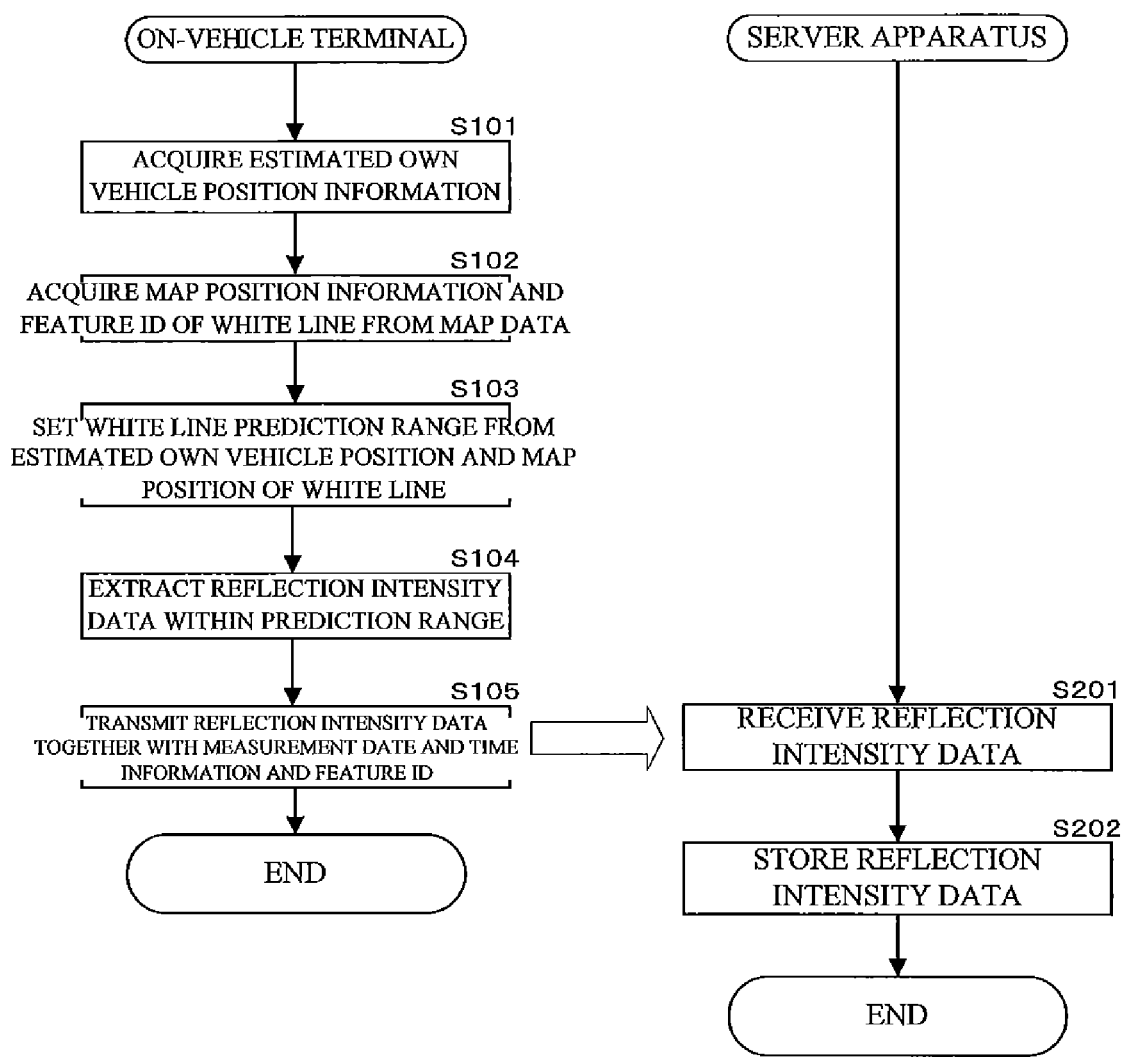
FIG. 6 is a flowchart illustrating an operation example of reflection intensity data processing by Map Data Management System according to an embodiment.

Next, an operation example of reflection intensity data processing by the map data management system S will be described using a flowchart of FIG. 6. Note that, although the flowchart of FIG. 6 describes a process in which one of the on-vehicle terminals 200 measures the reflection intensity data D and transmits it to the server apparatus 100, similar processing is executed by each of the on-vehicle terminals 200 included in the map data management system S. Further, the processing of steps S101 to S105 of the on-vehicle terminal 200 of FIG. 6 is executed periodically (for example, every predetermined time and/or each time a vehicle on which the on-vehicle terminal 200 is mounted moves a predetermined distance). In response to the processing of step S105 by the on-vehicle terminal 200, the server apparatus 100 executes processing of steps S201 to S202.

First, the control unit 201 of the on-vehicle terminal 200 acquires estimated own vehicle position information (step S101).

Next, the control unit 201 acquires map position information of a white line from map data corresponding to an estimated own vehicle position indicated by the estimated own vehicle position information acquired in the processing of step S101 (step S102). At this time, as described above, the control unit 201 acquires map position information and a feature ID of a white line in a traveling direction of the vehicle.

Next, the control unit 201 calculates and sets a white line prediction range from the estimated own vehicle position indicated by the estimated own vehicle position information and a white line map position indicated by the map position information of the white line (step S103).

Next, the control unit 201 extracts a piece of the pre-extraction reflection intensity data D within the white line prediction range from pieces of the pre-extraction reflection intensity data D measured by the Lidar 205, and obtains the post-extraction reflection intensity data D (step S104). Specifically, the control unit 201 first identifies the pre-extraction reflection intensity data D measured by emitting laser light in a range including the white line prediction range based on a measurement position of measurement position information stored in association with the pre-extraction reflection intensity data D, and an emission angle (a certain downward angle) when the Lidar 205 emits the laser light. Next, the control unit 201 obtains post-extraction reflection intensity data D2 by extracting a portion within the white line prediction range in the identified pre-extraction reflection intensity data D. For example, the control unit 201 extracts a portion corresponding to an azimuth (θ1, θ2 (see FIG. 5)) of the white line prediction range based on a vehicle direction.

Next, the control unit 201 transmits, to the server apparatus 100, the post-extraction reflection intensity data D extracted in the processing of step S104 together with measurement date and time information stored in association with the pre-extraction reflection intensity data D that is an extraction source of the post-extraction reflection intensity data D and the feature ID acquired in the processing of step S102 (step S105), and ends the processing at the time of transmitting reflection intensity data.

On the other hand, when receiving the post-extraction reflection intensity data D, the measurement date and time information, and the feature ID from the on-vehicle terminal 200 (step S201), the control unit 101 of the server apparatus 100 stores them in the storage unit 102 by associating them with each other (step S202), and ends the processing at the time of transmitting reflection intensity data. In this manner, a plurality of pieces of the post-extraction reflection intensity data D transmitted from each of a plurality of the on-vehicle terminals 200 is accumulated in the storage unit 102 of the server apparatus 100.

[4.2. Operation example at the time of degradation determination processing]

Next, an operation example of degradation determination processing by the server apparatus 100 will be described using a flowchart of FIG. 7. The degradation determination processing is executed, for example, in a case where an operator or the like instructs to perform degradation determination for a white line and designates a feature ID of the white line for which the degradation determination.

First, the control unit 101 of the server apparatus 100 acquires the designated feature ID (step S211). Next, the control unit 101 acquires, from the storage unit 102, the post-extraction reflection intensity data D stored in association with the feature ID, whose measurement date and time are within a predetermined period (for example, the last three months) (step S212). The reason for limiting an acquisition target to the reflection intensity data D whose measurement date and time is within a predetermined period is that the reflection intensity data D which is too old is not suitable for determining a current degradation state.

Next, the control unit 101 calculates an average of the extracted reflection intensity data D extracted in the processing of step S212 (step S213), and then calculates a standard deviation (step S214). Note that, in a case of calculating the average and the standard deviation, the control unit 101 processes the post-extraction reflection intensity data D for each feature ID (each of the white line W1 and the white line W2 in the example of FIGS. 3(A) and 4(A)). Further, in the example of FIGS. 3(A) and 4(A)), since reflection intensities are measured at five points for the white line W1, the control unit 101 calculates the average and the standard deviation of the reflection intensities at each point. Further, instead of obtaining the average and the standard deviation of reflection intensities at each of the five points, the control unit 101 may calculate the average and the standard deviation of reflection intensities at the five points or at points of a predetermined area (part or all of areas) included in the post-extraction reflection intensity data D.

Next, the control unit 101 determines whether or not the average calculated in the processing of step S213 is equal to or less than a first threshold (step S215). At this time, in a case of determining that the average is equal to or less than the first threshold (step S215: YES), the control unit 101 determines that the designated white line is "degraded" (step S217), performs update to add information indicating "degraded" to map data corresponding to the white line (step S218), and ends the degradation determination processing. Note that, in the processing of step S217, the control unit 101 determining that the designated white line is "degraded" is an example of identification of a degraded white line. On the other hand, in a case of determining that the average is not less than or equal to the first threshold (step S215: NO), the control unit 101 next determines whether or not the standard deviation calculated in the processing of step S214 is greater than or equal to a second threshold (step S216).

At this time, in a case of determining that the standard deviation is greater than or equal to the second threshold (step S216: YES), the control unit 101 determines that the designated white line is "degraded" (step S217), performs updating to add information indicating "degraded" to map data corresponding to the white line (step S218), and ends the degradation determination processing. On the other hand, when determining that the standard deviation is not greater than or equal to the second threshold (step S216: NO), the control unit 101 determines that the designated white line is "not degraded" (step S219), and ends the degradation determination processing. Note that the degradation determination processing may be performed by the control unit 201 of the on-vehicle terminal 200 instead of the control unit 101 of the server apparatus 100. In this case, the control unit 201 transmits, to the server apparatus 100, information indicating "degraded" to a feature corresponding to the white line determined to be degraded.

As described above, in the map data management system S according to the present embodiment, the control unit 101 (an example of the "acquisition unit" or the "identification unit") of the server apparatus 100 receives reflected light from a white line (an example of the "feature") of light emitted by a vehicle (an example of the "moving object") to acquire the reflection intensity data D measured in the vehicle, and identifies the degraded white line based on the acquired reflection intensity data D.

Therefore, according to the map data management system S of the present embodiment, a degraded white line can be identified by using the reflection intensity data D acquired from the vehicle. Note that, although it is conceivable to perform the degradation determination of a white line based on an image captured by a camera mounted on a vehicle, performing appropriate degradation determination is difficult due to restrictions, such as changes in brightness in the nighttime, backlight, and the like, camera resolution, and the like. Accordingly, the degradation determination using the reflection intensity data D as in the present embodiment is superior.

Further, the control unit 101 further acquires measurement date and time information indicating measurement date and time of the reflection intensity data D, selects the reflection intensity data D measured in a predetermined period based on the measurement date and time information, and identifies a degraded white line based on the selected reflection intensity data D. Therefore, by appropriately setting the predetermined period (for example, the last few months), a degraded white line can be identified appropriately based on reflection intensity data excluding the reflection intensity data D that is inappropriate for the white line degradation determination.

Furthermore, the control unit 101 further acquires a feature ID (an example of the "position information") for identifying a position of a white line that has reflected light, and identifies a degraded white line based on the reflection intensity data D and the feature ID. In this manner, a position of the degraded white line can also be identified.

Furthermore, the control unit 101 identifies a degraded white line based on the post-extraction reflection intensity data D measured within a white line prediction range set based on the map position information (an example of the "position information"). In this manner, the degradation determination can be performed excluding the reflection intensity data D indicating light reflected by features other than a white line, and the degradation determination can be performed for the white line with higher accuracy.

Figure 7:
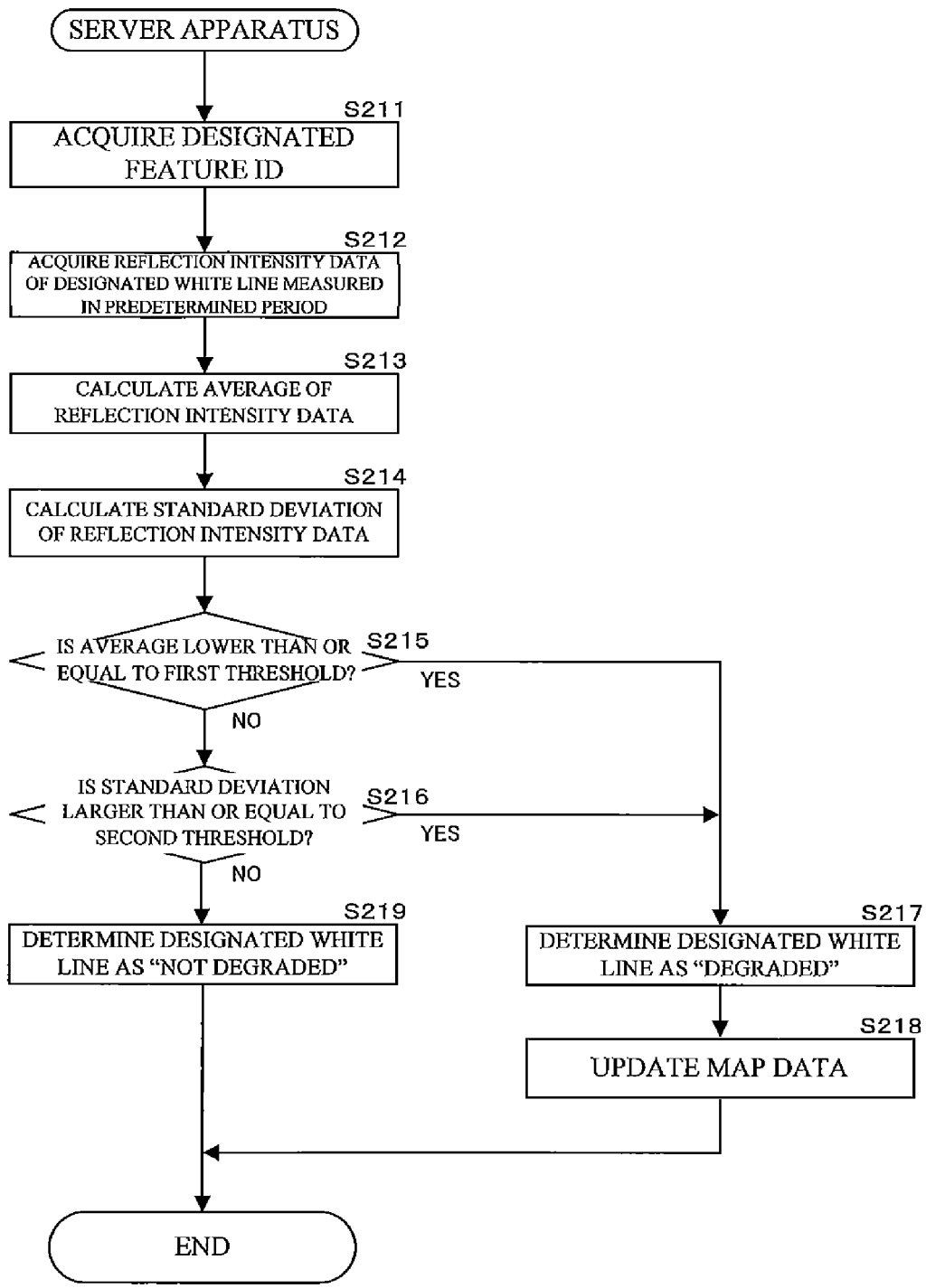
FIG. 7 is a flowchart illustrating an operation example of degradation determination processing by server apparatus according to an embodiment.

Furthermore, the control unit 101 (an example of the "update unit") updates map data corresponding to a white line determined to be "degraded" in the processing of step S217 of FIG. 7 (performs update of adding information indicating "degraded"). In this manner, the degradation information can be reflected on the map data representing the degraded white line.

Furthermore, the control unit 101 receives reflected light from a white line of light emitted by one or each of a plurality of vehicles, acquires the reflection intensity data D measured in the one or each of a plurality of vehicles, and identifies a degraded white line based on a plurality of pieces of the acquired reflection intensity data D. Therefore, according to the map data management system S of the present embodiment, it is possible to identify a degraded white line with high accuracy by using the reflection intensity data D acquired from one or a plurality of vehicles.

Note that, in the present embodiment, a feature for which the degradation determination is performed is described as a white line. However, the degradation determination can be performed for all features for which the degradation determination can be performed based on reflection intensity.

[5. Modification]

Next, a modification of the present embodiment will be described. Note that, modifications described hereinafter can be combined as appropriate.

[5.1. First Modification]

Although the case where a white line for which the degradation determination is performed is a solid line is described in the above embodiment, the white line may be a broken line. Further, white lines are used not only to separate lanes, but also for a zebra zone, a character, a pedestrian crossing, and the like. Furthermore, targets of the degradation determination can include not only a white line but also features, such as a sign and a signboard. That is, features to be subjected to the degradation determination can be classified into various types. In view of the above, feature type information indicating a type of a feature may be further linked to a feature ID, and a threshold in the degradation determination using reflection intensity data may be changed according to the type of a feature.

Further, in a case where a white line is a broken line, a feature ID may be set to each portion where the white line is painted, and a portion where the white line is not painted may be excluded from a target of the degradation determination without setting a feature ID. Note that, as to a zebra zone, a character, a pedestrian crossing, and the like, since there is a case where a direction of a white line is not parallel to a traveling direction of a vehicle, the configuration may be such that a setting method of the white line prediction range is determined for each type of a white line (for example, position information of four corners of a white line prediction range is described in map data, and the control unit 201 of the on-vehicle device 200 sets the white line prediction range based on the position information), and the white line prediction range is set according to a type of the white line for which degradation determination is to be performed.

[5.2. Second Modification]

The reflection intensity measured by the Lidar 205 varies depending on measurement date and time and the weather at the time of measurement because the reflection intensity is affected by sunlight. For example, even for the reflection intensity for the same white line, the reflection intensity at dawn or dusk and the reflection intensity in the daytime are different. Further, the reflection intensity at the time of fine weather and the reflection intensity at the time of cloudy weather, raining, snowing, and the like are also different. Therefore, in a second modification, when receiving the reflection intensity data D from the Lidar 205, the control unit 201 of the on-vehicle device 200 stores the reflection intensity data D in the storage unit 202 by further associating weather information indicating the weather at the time of measurement. In the processing of step S105 in FIG. 6, the reflection intensity data D is transmitted to the server apparatus 100 by being further associated with the weather information, and the server apparatus 100 also stores the reflection intensity data D in the storage unit 102 by further associating the weather information. Then, the control unit 101 of the server apparatus 100 may correct the reflection intensity data D in accordance with at least either one of the measurement date and time information and the weather information (an example of the "accompanying information"), and then identify a degraded feature. In this manner, a difference between pieces of the reflection intensity data due to time or the weather at the time of measurement can be offset, and the degradation determination can be appropriately performed.

[5.3. Third Modification]

In the above embodiment, the control unit 201 of the on-vehicle terminal 200 periodically transmits the reflection intensity data D to the server apparatus 100. In addition to the above, there may be added a condition that the control unit 201 transmits only the reflection intensity data D that the on-vehicle terminal 200 (own vehicle) measures in a predetermined area (for example, a measurement area designated by the server apparatus 100). In this manner, for example, with the server apparatus 100 designating an area where the degradation determination of a white line needs to be performed as the measurement area, the reflection intensity data D measured in an area where the degradation determination of a white line does not need to be performed does not need to be received. In this manner, reduction in a communication data amount between the on-vehicle terminal 200 and the server apparatus 100, saving of the storage capacity of the storage unit 102 of the server apparatus 100 that stores the reflection intensity data D, and reduction in a processing load related to the degradation determination can be achieved.

Further, the configuration may be such that the control unit 101 of the server apparatus 100 refers to map position information (an example of the "position information") stored in the storage unit 102 together with the reflection intensity data D, and identifies a degraded white line based on reflection intensity data measured in a designated area (for example, an area, for which the degradation determination of a white line needs to be performed, designated by an operator or the like). In this manner, by designating an area for which the degradation determination needs to be performed, it is possible to perform the degradation determination only for a white line in the area, and a processing load can be reduced more than a case where the degradation determination is performed for an area for which the degradation determination does not need to be performed.

[5.4. Fourth Modification]

Figure 8A:
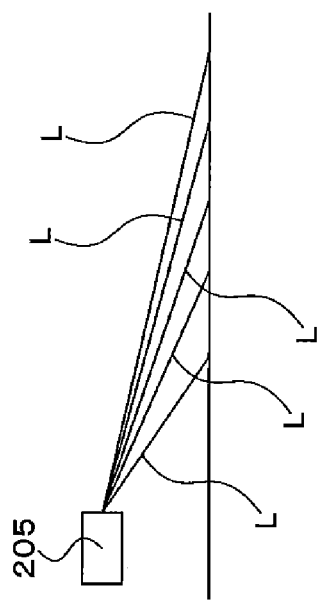
FIG. 8(A) is a side view illustrating how Lidar emits a plurality of light in the vertical direction according to the fourth modification.
Figure 8B:
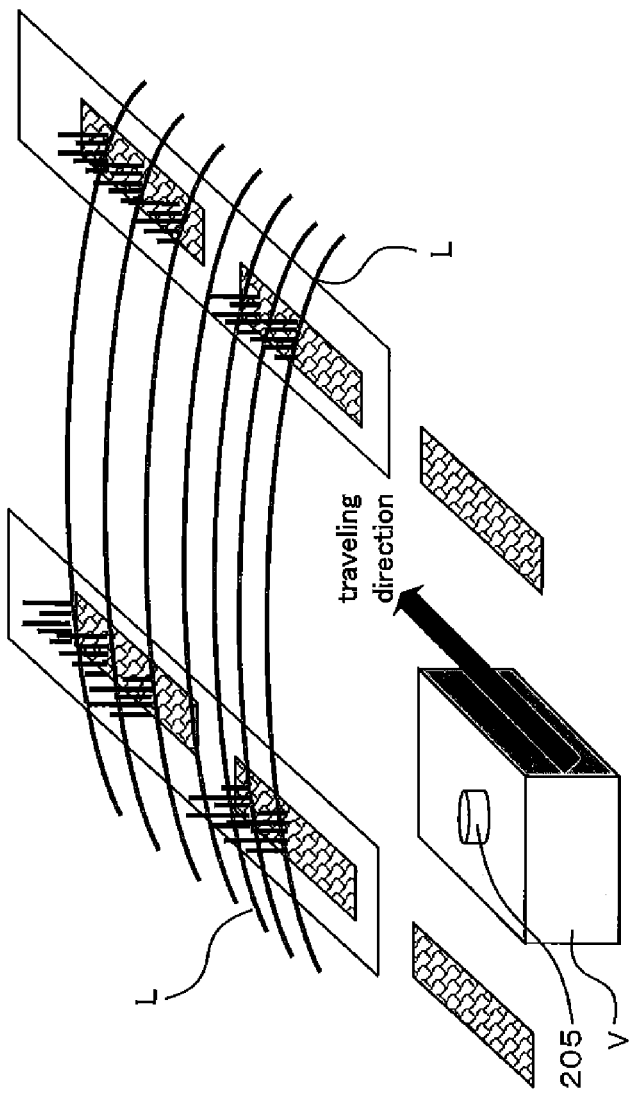
FIG. 8(B) is a view illustrating how said Lidar measures the light reflection intensity at a white line.

In the above embodiment, the Lidar 205 is attached to the roof of a vehicle and the like, and emits a single ray of the infrared laser light L so as to draw a circle around the vehicle at a certain downward angle. However, for example, as shown in FIG. 8(A), the Lidar 205 may emit a plurality of (five in FIG. 8(A)) rays of the infrared laser light L at various emission angles in a downward direction so as to draw a circle around the vehicle. In this manner, as shown in FIG. 8(B), the reflection intensity data D can be measured along the traveling direction of the vehicle at once. Further, as in the above embodiment, measurement of the reflection intensity data D by emitting a single ray of the infrared laser light L is performed every time the vehicle V moves a predetermined distance, and by combining the reflection intensity data D, the reflection intensity data D can be obtained along the traveling direction of the vehicle like the example shown in FIG. 8.

Figure 9A:
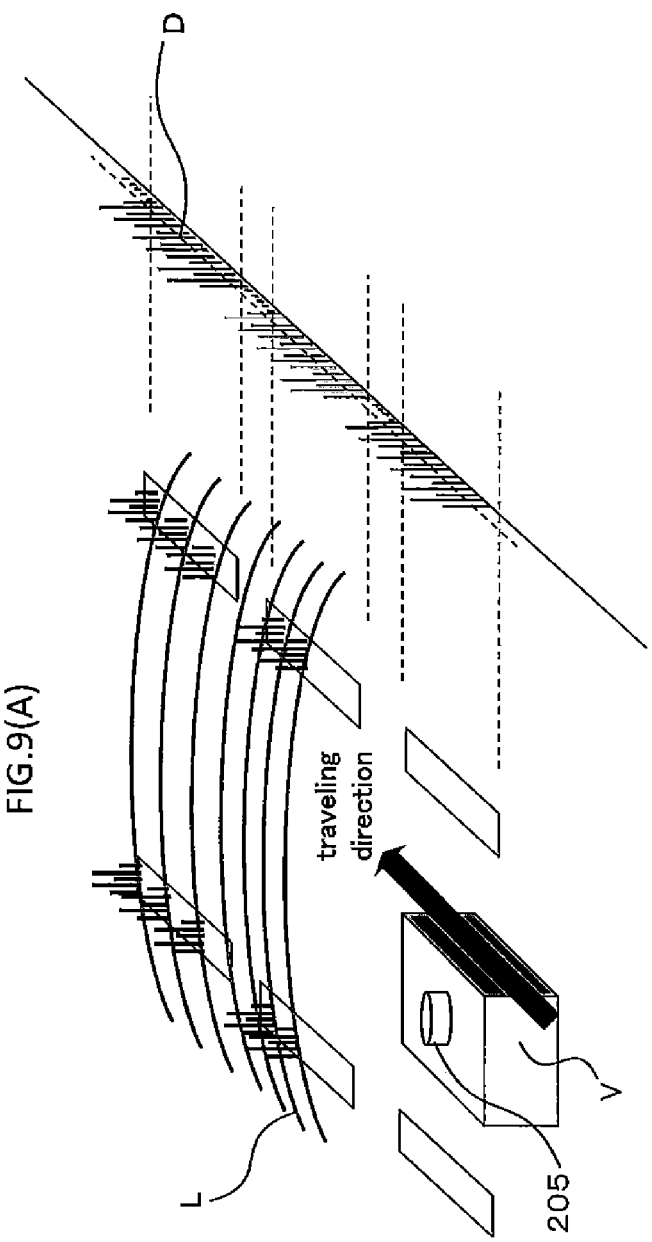
FIG. 9(A) is a view illustrating an example of the reflective intensity measured about the white line of a broken line along the traveling direction of the vehicle according to the fourth modification.
Figure 9B:
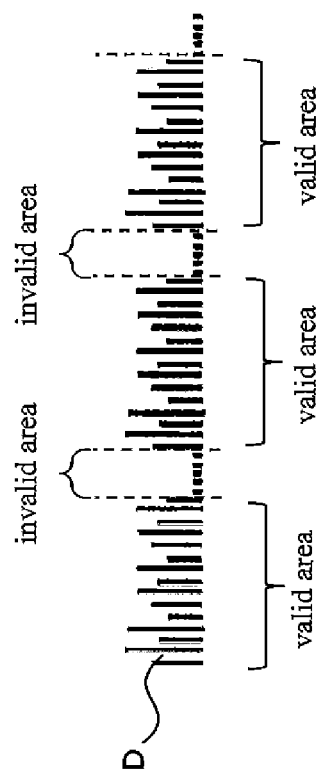
FIG. 9(B) is a view illustrating an valid area and an invalid area for dividing the reflection intensity used for the degradation determination based on the distribution of the reflection intensity

Further, as described in the first modification, as shown in FIG. 9(A), in a case where a white line is a broken line, a portion where the white line is not painted, where degradation of a white line is not generated in the first place, is preferably excluded from the target of the degradation determination. In view of the above, the configuration may be such that the control unit 101 of the server apparatus 100 divides an area into a portion (painted area) where a white line is painted as a valid area and a portion (non-painted area) where a white line is not painted as an invalid area based on the reflection intensity data D measured along the traveling direction of the vehicle V as described above, and performs the degradation determination based only on reflection intensity corresponding to the valid area. Specifically, as shown in FIGS. 9(A) and 9(B), the reflection intensity indicated by the reflection intensity data D measured along the traveling direction of the vehicle V with respect to a broken white line is roughly classified into a high value for the painted area and a low value for the non-painted area. Accordingly, a threshold is set, and an area is divided into a valid area where the reflection intensity is equal to or more than the threshold and an invalid area other than the valid area. In this manner, as described in the first modification, a feature ID can be set for each predetermined distance as similar to a white line as a solid line without setting a feature ID for each painted area of a white line as a broken line, and it is possible not to perform the degradation determination for the non-painted area. Note that, the method of dividing the paint area (valid area) and the non-painted area (invalid area) may be employed for the degradation determination for a zebra zone, a character, a pedestrian crossing, and the like configured with the painted area and the non-painted area, in addition to a white line as a broken line.

[5.5. Fifth Modification]

In the above embodiment, the white line prediction range is calculated in advance, and the reflection intensity data D included in the white line prediction range is processed as light reflected by a white line. That is, it has been guaranteed that the post-extraction reflection intensity data D transmitted by the on-vehicle terminal 200 to the server apparatus 100 is data indicating the reflection intensity of a white line. In a fifth modification, the on-vehicle terminal 200 transmits the pre-extraction reflection intensity data D received from the Lidar 205 to the server apparatus 100 in association with the measurement position information and the measurement date and time information. Then, the control unit 101 of the server apparatus 100 identifies the reflection intensity based on the reflection by a white line based on the distribution of the reflection intensity indicated by the pre-extraction reflection intensity data D and the positional relationship of the white line that divides a lane where a vehicle travels, and performs the degradation determination based on the identified reflection intensity. Then, the configuration may be such that, in a case where a feature is determined to be degraded by the degradation determination, a position of a degraded white line is identified based on a combination of the measurement position information corresponding to the reflection intensity data D and information indicating an emission angle at which the Lidar 205 emits the laser light L. In this manner, it is possible to reduce a processing load of the on-vehicle terminal 200 for processing of extracting a portion used for the degradation determination for a white line from the pre-extraction reflection intensity data D measured by Lidar 205 and acquisition processing of a map position of a white line. Further, in the fifth modification, even if the map data stored in the storage unit 202 does not have position information of a white line, the server apparatus 100 can perform the degradation determination of a white line.

[5.6. Sixth Modification]

Figure 10:
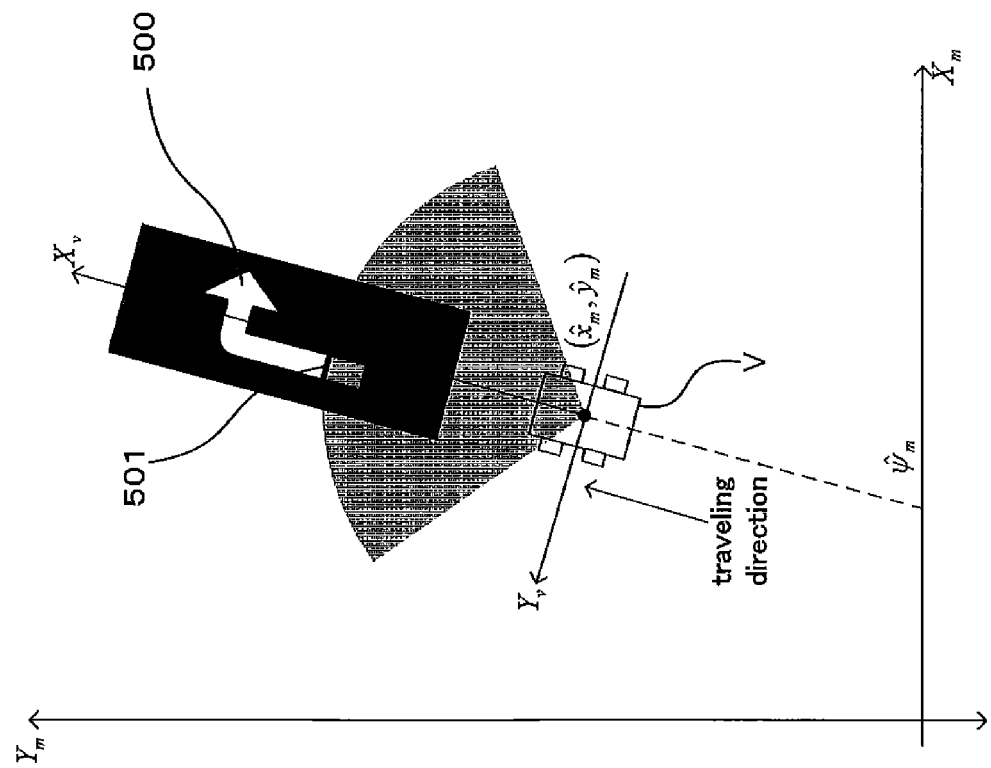
FIG. 10 is a view for describing a method of acquiring paint portion reflection intensity data 501 indicating reflection intensity in a road surface paint portion.

A sixth modification that determines deterioration of a design (sometimes referred to as a "painted portion"), such as an arrow, a zebra zone, a character, a pedestrian crossing, and the like, painted on a road surface will be described by using FIGS. 10 and 11. FIG. 10 is a diagram for explaining a method of acquiring painted portion reflection intensity data 501 indicating the reflection intensity in the painted portion. FIG. 11 is a conceptual diagram in a case where reflection intensity map data 510 is generated by combining a plurality of pieces of the painted portion reflection intensity data 501.

First, a method of acquiring the painted portion reflection intensity data 501 indicating the reflection intensity of an right turn arrow 500 (painted portion) will be specifically described by using FIG. 10. A coordinate system and the like in FIG. 10 are as described below.

Map coordinate system:

$X_m, Y_m$

Vehicle coordinate system:

$X_v, Y_v$

Painted portion position (painted position as viewed from vehicle) in map coordinate system:

$(lx_m, ly_m)$

Painted portion position (painted position as viewed from map) in vehicle coordinate system:

$(lx_v, ly_v)$

Estimated own vehicle position in map coordinate system:

$(\hat{x}_m, \hat{y}_m)$

Estimated own vehicle azimuth in map coordinate system:

$\hat{\psi}_m$

Further, a road surface painted position in the map coordinate system can be obtained by following Equation (2):

[Math 2]

$$\begin{bmatrix} lx_m \\ ly_m \end{bmatrix} = \begin{bmatrix} \cos\hat{\psi}_m & -\sin\hat{\psi}_m \\ \sin\hat{\psi}_m & \cos\hat{\psi}_m \end{bmatrix} \begin{bmatrix} lx_v \\ ly_v \end{bmatrix} + \begin{bmatrix} \hat{x}_m \\ \hat{y}_m \end{bmatrix} \quad (2)$$

The control unit 201 of the on-vehicle terminal 200 acquires a plurality of pieces of the painted portion reflection intensity data 501 on the right turn arrow 500 as the vehicle V travels. For example, as shown in FIG. 11, as the vehicle V travels, painted portion reflection intensity data 501A, painted portion reflection intensity data 501B, painted portion reflection intensity data 501C, and painted portion reflection intensity data 501D are sequentially acquired. Each piece of the painted portion reflection intensity data 501 includes reflection intensities at a plurality of positions (points) on a painted portion obtained by one emission of the laser light by the Lidar 205. For example, the painted portion reflection intensity data 501A, which is shown in a horizontally elongated shape in FIG. 11, indicates the reflection intensities at a plurality of positions on a painted portion obtained by one emission of the laser light. That is, the painted portion reflection intensity data 501A is data including the reflection intensity at each of a plurality of positions (points) aligned in a lateral direction. Then, the control unit 201 transmits, to the server apparatus 100, information indicating each reflection intensity at a plurality of positions included in each piece of the painted portion reflection intensity data 501 in association with information indicating a road surface painted position in a map coordinate system calculated based on Equation (2) described above. Note that the configuration may be such that the control unit 201 transmits the painted portion reflection intensity data 501 only for a painted portion designated in advance by the server apparatus 200 or the like to the server apparatus 100.

As shown in FIG. 11, the control unit 101 of the server apparatus 100 generates the reflection intensity map data 510 (an example of the "reflection intensity distribution") by combining a plurality of pieces of the painted portion reflection intensity data 501A to 501D received from one or a plurality of the on-vehicle terminals 200 based on information indicating a painted portion position in a map coordinate system associated with the painted portion reflection intensity data 501. The reflection intensity map data 510 is data that holds the reflection intensity for each position coordinate, and has, for example, a data structure, such as (X1, Y1, I1), (X2, Y2, I2), . . . , (Xn, Yn, In) (where I represents the reflection intensity and X and Y represent position coordinates at which the reflection intensity I is obtained). Then, the control unit 101 determines a degradation position and a degradation state of a painted portion by analyzing the reflection intensity in the reflection intensity map data 510. Note that, instead of the control unit 101 of the server apparatus 100, the control unit 201 of the on-vehicle terminal 200 may generate the reflection intensity map data 510 and transmit the reflection intensity map data 510 to the server apparatus 100. Further, the control unit 201 of the on-vehicle terminal 200 may generate the reflection intensity map data 510, further determine a degradation position and a degradation state, and transmit degradation information indicating the degradation position and the degradation state to the server apparatus 100.

In the sixth modification, the reflection intensity map data is generated using the painted portion reflection intensity data 501 obtained by one or a plurality of the vehicles V, so that high-density distribution information on the reflection intensity can be obtained. Therefore, degradation can be determined even for a painted portion having a shape (such as a character) more complicated than a white line. Further, the server apparatus 100 statistically processes the painted portion reflection intensity data 501 acquired from one or a plurality of the vehicles V, so that the determination accuracy of a degradation position and a degradation state can be improved.

Figure 12B:
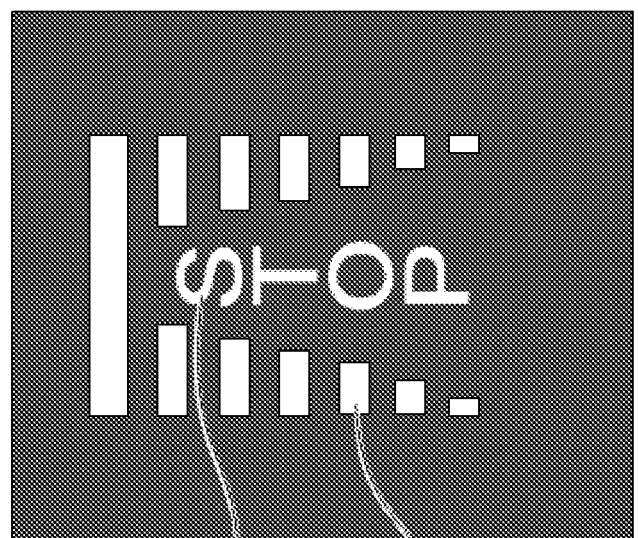
FIG. 12(A) and FIG. 12(B) are examples of a paint section drawn on the road surface.
Figure 12A:

Note that, in determining degradation of a painted portion, for example, a priority (weighting) may be set according to the content indicated by each painted portion, and a threshold used in the degradation determination may be changed according to the priority. Specifically, for a painted portion that presents important information, a priority is set to be high, and a threshold is set to be low so that the painted portion can be easily determined to be degraded. For example, in FIG. 12(A), a priority is set to be high for a painted portion 551 representing "STOP" and a painted portion 552 representing a "bicycle mark", and a priority is set to be low for a painted portion 553 representing a "triangle mark". Similarly, in FIG. 12(B), a priority is set to be high for a painted portion 561 representing "STOP", and a priority is set to be low for a painted portion 562 representing a "bar". In this manner, a thresholds used for the degradation determination is set to be low for the painted portion 551, the painted portion 552, and the painted portion 561, and even mild degradation is determined to be degradation. By setting a priority according to the content indicated by a painted portion as described above, a portion with a low priority that is mildly degraded is determined not to be degraded. That is, by using a priority, determination of degradation can be performed flexibly according to the content indicated by a painted portion.

Further, such degradation determination of a painted portion can be performed not only for a white painted portion, but also for a painted portion of other colors, such as yellow. At this time, since there is a case where the reflection intensity varies depending on a color of a painted portion, a threshold used in the degradation determination may be changed according to the color of the painted portion.

EXPLANATION OF REFERENCE NUMERALS 1 degraded feature identification apparatus
1A acquisition unit
1B identification unit
S map data management system
100 server apparatus
101 control unit 102 storage unit
103 communication unit
104 display unit
105 operation unit
200 on-vehicle terminals
201 control unit
202 storage unit
203 communication unit
204 interface unit
205 Lidar
206 internal sensor

The invention claimed is:

1. A degraded feature identification apparatus comprising:
at least one memory configured to store a program; and
a central processing unit (CPU) coupled to the at least one memory and configured to execute the program to:
acquire reflection intensity data based on light emitted from a laser and reflected by a feature, and
identify a degraded feature based on the acquired reflection intensity data,
acquire measurement date and time information indicating measurement date and time of the reflection intensity data,
select the reflection intensity data measured in a predetermined period based on the measurement date and time information, and identifies the degraded feature based on the selected reflection intensity data,
acquire feature type information indicating a type of a feature for which the reflection intensity data is measured, and
determine whether a feature is degraded based on a threshold, and changes the threshold according to a type of the feature.

2. The degraded feature identification apparatus according to claim 1, wherein the CPU is further configured to:
acquire accompanying information including weather information indicating a weather at the time of measurement of the reflection intensity data, and
identify the degraded feature after correcting the reflection intensity data according to the accompanying information.

3. The degraded feature identification apparatus according to claim 1, wherein the CPU is further configured to:
acquire position information for identifying a position of a feature that reflects the light, and
identify the degraded feature based on the position information.

4. The degraded feature identification apparatus according to claim 3, wherein the CPU is further configured to:
identify the degraded feature based on the reflection intensity data measured in a designated area with reference to the position information.

5. The degraded feature identification apparatus according to claim 3, wherein the CPU is further configured to:
prepare reflection intensity distribution based on the reflection intensity data acquired according to movement of a moving body on which the laser is mounted, and
identify the degraded feature based on the prepared reflection intensity distribution.

6. The degraded feature identification apparatus according to claim 1, wherein the CPU is further configured to:
update map data corresponding to the identified degraded feature.

7. The degraded feature identification apparatus according to claim 1, wherein the CPU is further configured to:
transmit information indicating the identified degraded feature.

8. A degraded feature identification apparatus comprising:
at least one memory configured to store a program; and
a central processing unit (CPU) coupled to the at least one memory and configured to execute the program to:
acquire reflection intensity data based on light emitted from a laser and reflected by a feature, and
identify a degraded feature based on the acquired reflection intensity data,
acquire measurement date and time information indicating measurement date and time of the reflection intensity data,
select the reflection intensity data measured in a predetermined period based on the measurement date and time information, and identifies the degraded feature based on the selected reflection intensity data,
prepare reflection intensity distribution based on the reflection intensity data acquired according to movement of a moving body on which the laser is mounted, the reflection intensity distribution includes information indicating a priority in identifying the feature that is degraded, and
identify the degraded feature based on the prepared reflection intensity distribution and on the information indicating the priority.

9. A degraded feature identification method by a degraded feature identification apparatus, comprising:
an acquisition step of acquiring reflection intensity data based on light emitted from a laser and reflected by a feature; and
an identification step of identifying a degraded feature based on the reflection intensity data acquired by the acquisition step
wherein the acquisition step further acquires measurement date and time information indicating measurement date and time of the reflection intensity data, and
the identification step selects the reflection intensity data measured in a predetermined period based on the measurement date and time information, and identifies the degraded feature based on the selected reflection intensity data,
wherein the acquisition step further acquires feature type information indicating a type of a feature for which the reflection intensity data is measured, and
the identification step determines whether a feature is degraded based on a threshold, and changes the threshold according to a type of the feature.

10. A non-transitory computer-readable recording medium recording a degraded feature identification program that causes a computer to:
acquire reflection intensity data based on light emitted from a laser and reflected by a feature,
identify a degraded feature based on the acquired reflection intensity data,
acquire measurement date and time information indicating measurement date and time of the reflection intensity data,
select the reflection intensity data measured in a predetermined period based on the measurement date and time information, and identifies the degraded feature based on the selected reflection intensity data,
acquire feature type information indicating a type of a feature for which the reflection intensity data is measured, and determine whether a feature is degraded based on a threshold, and changes the threshold according to a type of the feature.

11. A degraded feature identification apparatus comprising:
at least one memory configured to store a program; and
a central processing unit (CPU) coupled to the at least one memory and configured to execute the program to:
acquire reflection intensity data based on light emitted from a laser and reflected by a feature, and
identify a degraded feature based on the acquired reflection intensity data,
acquire measurement date and time information indicating measurement date and time of the reflection intensity data,
select the reflection intensity data measured in a predetermined period based on the measurement date and time information, and identifies the degraded feature based on the selected reflection intensity data,
acquire first feature measurement date and time information indicating measurement date and time of the reflection intensity data about the first feature,
select a plurality of pieces of the reflection intensity data about the first feature measured in a predetermined period based on the first feature measurement date and time information, and
perform degradation determination about the first feature by statistically processing selected the plurality of pieces of the reflection intensity data.

12. The degraded feature identification apparatus according to claim 11, wherein the CPU is further configured to:
acquire feature type information indicating a type of a feature for which the reflection intensity data is measured, and
determine whether a feature is degraded based on a threshold, and changes the threshold according to a type of the feature.

* * * * *